US007123613B1

(12) United States Patent
Chawla et al.

(10) Patent No.: US 7,123,613 B1
(45) Date of Patent: Oct. 17, 2006

(54) APPARATUS AND METHOD FOR PROVIDING A TRANSPARENT PROXY SERVER

(75) Inventors: Rajeev Chawla, Fremont, CA (US); Thomas K. Wong, Pleasanton, CA (US); Panagiotis Tsirigotis, Mountain View, CA (US); Omid Ahmadian, Menlo Park, CA (US); Sanjay R. Radia, Fremont, CA (US); Ashvin Kamaraju, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/545,571

(22) Filed: Apr. 7, 2000

(51) Int. Cl.
    *H04L 12/56* (2006.01)
(52) U.S. Cl. ...................... 370/389; 370/401
(58) Field of Classification Search ............... 370/389, 370/392, 400, 401; 709/201, 203, 227, 228, 709/230, 238
See application file for complete search history.

(56) References Cited

U.S. PATENT DOCUMENTS

| 5,781,550 | A  | * | 7/1998  | Templin et al. ........... 370/401 |
| 6,006,268 | A  | * | 12/1999 | Coile et al. ............... 709/227 |
| 6,182,141 | B1 | * | 1/2001  | Blum et al. ............... 709/227 |
| 6,240,461 | B1 | * | 5/2001  | Cieslak et al. ............. 709/235 |
| 6,389,462 | B1 | * | 5/2002  | Cohen et al. .............. 709/218 |
| 6,473,406 | B1 | * | 10/2002 | Coile et al. ............... 370/248 |
| 6,532,493 | B1 | * | 3/2003  | Aviani et al. ............... 709/224 |

OTHER PUBLICATIONS

Chatel, M. "Classical versus Transparent IP Proxies". Network Working Group 1919. Mar. 1996. pp. 1-35.*

Knutsson et al. "Transparent Proxy Signaling". Copyright 1999. pp. 1-11.*
Stallings, William. Local Metropolitan Area Networks. Fourth Edition. Macmillan Publishing Company. Copyright 1993. pp. 454-456.*
K. Egevang, et al., *RFC 1631 The IP Network Address Translator (NAT)*, http://www.ietf.org/rfc/rfc1631.txt?number=1631, Network Working Group, May 1994, pp. 1-10.
T. Berners-Lee, et al., *RFC 1945 Hypertext Transfer Protocol—HTTP/1.0*, http://www.ietf.org/rfc/rfc1945. txt?number=1945, Network Working Group, May 1996, pp. 1-57.
http://www.ietf.org/rfc/rfc0791.txt?number=791, *RFC 791 Internet Protocol*, USC Sep. 1981, pp. 1-49.
*getsockopt(3SOCKET) man page*, Sockets Library Functions, Nov. 1999, pp. 1-5.

* cited by examiner

*Primary Examiner*—Derrick Ferris
(74) *Attorney, Agent, or Firm*—Finnegan, Henderson, Farabow, Garrett & Dunner, L.L.P.

(57) ABSTRACT

A transparent proxy server is implemented by directing particular client packets to a proxy server that handles communications between the client and an origin server. When a client sends a packet to an origin server, a router transparently redirects the packet to the proxy server by storing the proxy server address in the destination field and the origin server address in the record route options field. The proxy server sends connection setup requests to the origin server and forwards acknowledgement packets to the client. For other requests, the proxy server determines whether the requested information is stored in the proxy server cache. If so, the information is retrieved from the cache; if not, the information is retrieved from the origin server. All acknowledgement and information packets are sent to the client with the origin server address in the source field, making it appear that the origin server sent the packets.

40 Claims, 15 Drawing Sheets

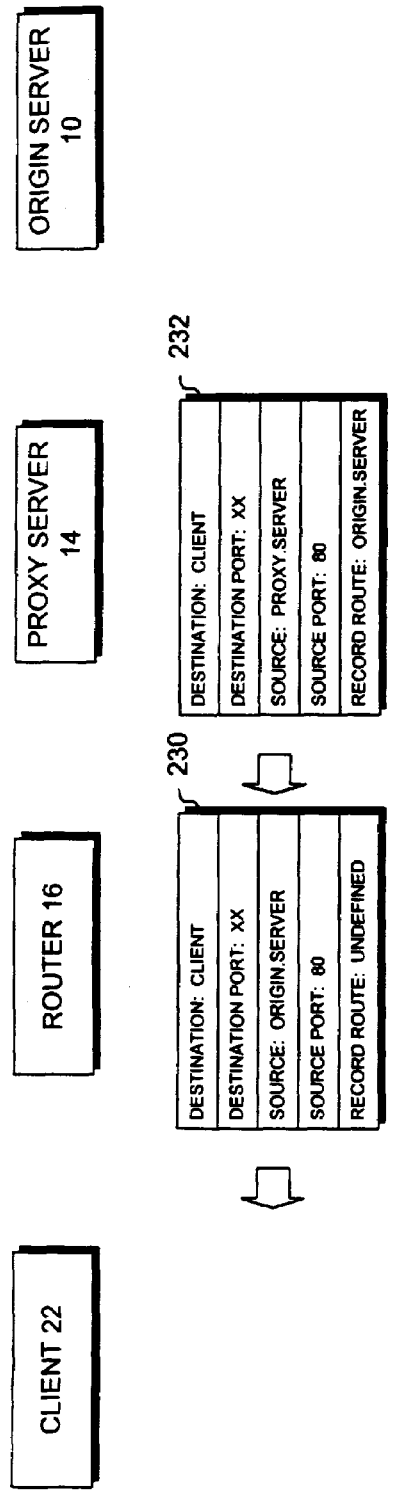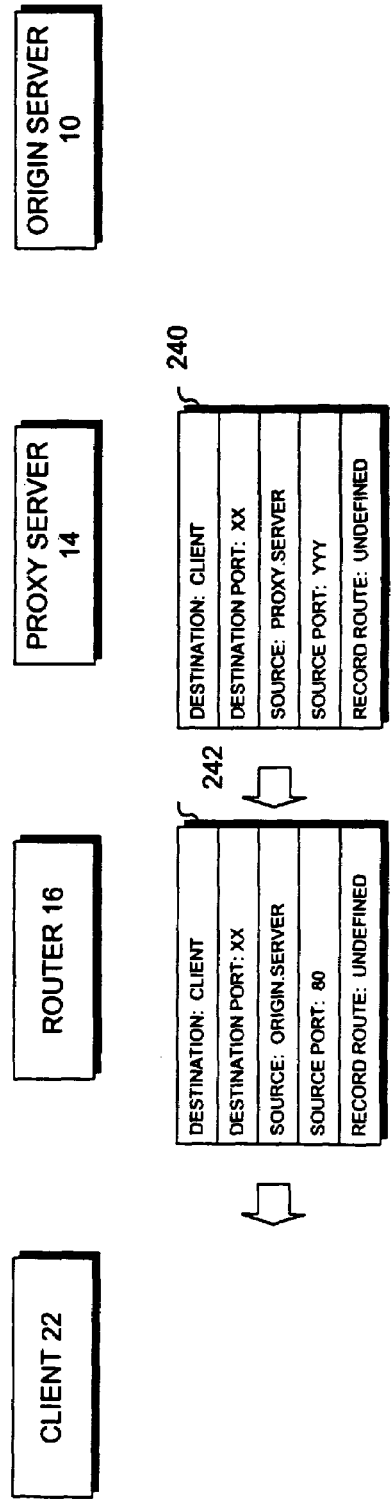

APPARATUS AND METHOD FOR PROVIDING A TRANSPARENT PROXY SERVER

I. BACKGROUND OF THE INVENTION

The present invention relates generally to proxy servers, and in particular to apparatus and methods for implementing a transparent proxy server.

A computer equipped with a communication mechanism, such as a modem and telephone connection, is all that is necessary to access to the Internet. A program on the computer, called a Web browser, e.g., Netscape Navigator from Netscape Corporation, provides a simple user interface for accessing the vast body of information available on the Internet and, specifically, its subpart known as the "World Wide Web."

The architecture of the Web follows a conventional client-server model. The terms Web client and Web server refer to using a computer as a requester of Web data (the client) and using a computer as a provider of the requested Web data (the server). An origin server is a particular type of Web server that stores data requested by a client. A common form of Web data is specially-formatted documents stored on an origin server. For example, HyperText Markup Language (HTML) is an often-used format.

A Web browser resides on each client and is used to request the specially-formatted documents from origin servers. Clients and origin servers communicate using packets having a protocol called HyperText Transfer Protocol (HTTP). Each HTTP packet has fields identifying the source of the packet, the destination of the packet, and possibly other data or information depending on the type of packet.

In a typical session between a client and origin server the client opens a connection to the origin server and initiates a request, such as a request for a document. The client initiates opening the connection by sending a synchronization (SYN) packet to the origin server. The origin server completes setting up the connection by sending an acknowledgment (ACK) packet to the client.

The client then sends a request packet to the origin server. The origin server responds to the request packet by performing the request. For example, in response to a request for an object the origin server retrieves the object, such as a Web document, and transmits the Web document to the client. After the document is delivered to the client, the connection is closed. The client displays the document or performs a function designated by the document.

One variation of this model uses a second type of server, a proxy server, which is an intermediary server between a client and an origin server. The proxy server receives packets from the client, and handles communications with the origin server on behalf of the client. For example, if the client requests information, the proxy server requests the information from the origin server on behalf of the client, receives the requested information, and forwards the requested information to the client.

Some proxy servers provide added services, such as caching. Caching involves storing information frequently requested from origin servers. The information is stored in a temporary, and typically fast, memory device at the proxy server. If the proxy server receives a client request for information contained in the proxy server cache, the proxy server retrieves the requested information from the proxy server cache and transmits it to the client. This eliminates the typical delay of requesting the information from the origin server and waiting for the information, and also reduces traffic on the network.

Using a proxy server, however, requires configuring the client by storing the proxy server Internet protocol (IP) address in the client browser. The client browser sends packets to the proxy server by placing the proxy server IP address in the destination field of the packet. Configuring a client browser is cumbersome because someone must set the IP address of the proxy server in the client browser. Setting the IP address may be difficult, particularly for the uninitiated. Consequently, proxy servers are generally only used in settings having someone with an understanding of how to store the proxy server IP address in the client browser. For example, proxy servers are sometimes used when there is a network administrator who can configure each browser with the IP address of a proxy server.

Thus, a need exists for a proxy server that allows a client to take advantage of the benefits of using a proxy server in handling client packets without requiring special configuration of the client.

II. SUMMARY OF THE INVENTION

Apparatus and methods consistent with the present invention provide a transparent proxy server. Using the apparatus and methods consistent with the invention, a client attempts to set up a connection directly with the origin server, but a connection is instead set up between the client and a proxy server. The proxy server handles requests on behalf of the client even though the client has not been configured to communicate with the proxy server.

A method consistent with the principles of the invention, performed by an intermediate entity between a client and a destination, comprises analyzing a communication from a client that is addressed to a destination, and attempting to set up a connection with the destination. An apparatus consistent with the principles of the invention comprises an intermediate entity for analyzing a communication from a client that is addressed to a destination and attempting to set up a connection with the destination.

Apparatus and methods consistent with the transparent proxy server provide a way to set up a connection between a client and a proxy server when the client attempts to set up a connection to an origin server. The connection is set up between the client and proxy server even though the client has not been configured to communicate with the proxy server. Such apparatus and methods overcome the problems of conventional proxy server systems that require configuring the client with the IP address of the proxy server. Additional advantages of the invention are apparent from the description which follows, and may be learned by practice of the invention. It is to be understood that both the foregoing general description and the following detailed description are exemplary and explanatory only and are not restrictive of the invention, as claimed.

III. BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings, FIG. 1 is a block diagram of a system in which apparatus and methods consistent with the invention may be practiced;

FIG. 14 illustrates the fields of packets in an embodiment in which a proxy server stores the origin server IP address in the record route options field to communicate to the source of the information to a router;

FIG. 15 illustrates the fields of packets being transmitted by a proxy server and a router in accordance with yet another embodiment of the invention.

IV. DETAILED DESCRIPTION

Figure 1:
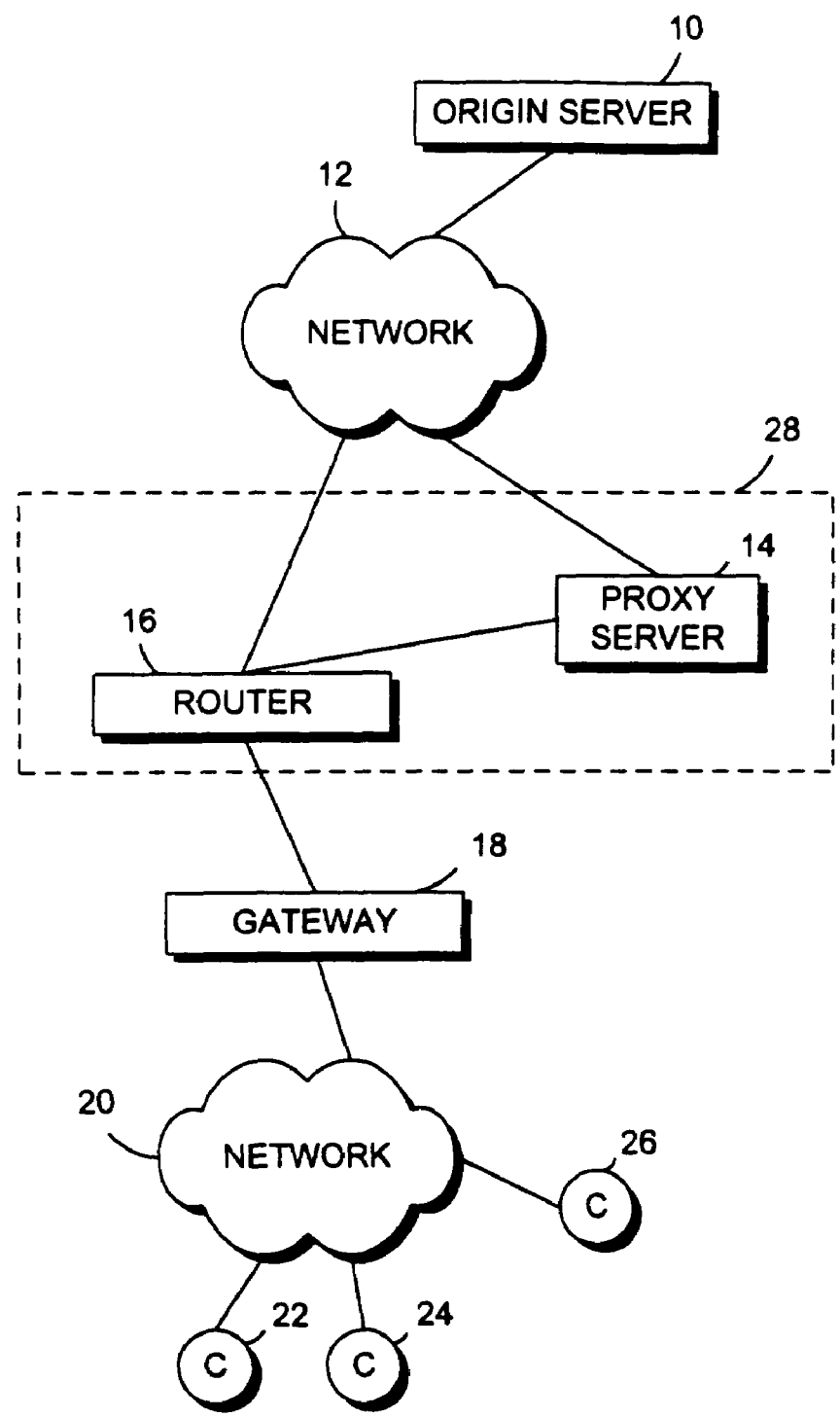

Systems and methods consistent with the invention implement a proxy server scheme that is transparent to a client. More particularly, the invention provides a proxy server, which may include a cache, in such a way that a client attempting to set up a connection to an origin server is instead connected to a proxy server, even though the client has not been configured to set up a connection with the proxy server.

The client prepares packets for transmission to an origin server and receives packets that appear to be from the origin server, even though the packets from the client are sent to a proxy server and the packets received by the client are from the proxy server. This is made possible by, in one embodiment, a router that receives all packets sent by clients, determines which packets are being sent to a particular type of origin server, and redirects those packets to the proxy server. The proxy server then responds to the client as if it were the origin server.

Initially, to set up a connection with an origin server, the client sends a SYN packet to the origin server. If the router identifies the SYN packet as being destined for a particular type of origin server, the SYN packet is routed to the proxy server. In response to the SYN packet, the proxy server attempts to set up a connection with the origin server in a similar manner, by sending a SYN packet to the origin server. If the proxy server does not receive an SYN-ACK packet from the origin server, the proxy server does not send an SYN-ACK packet to the client, thus mirroring the response by the origin server. If the proxy server receives an SYN-ACK packet from the origin server, however, the proxy server returns an SYN-ACK packet to the client that appears to be from the origin server. The client responds by sending an ACK packet, which is received by the proxy server. The proxy server in turn sends an ACK packet to the origin server. This exchange establishes a connection between the client and the proxy server, and a connection between the proxy server and the origin server.

Other initial connection setups may also be used. For example, the proxy server, in response to receiving a request from the client, may establish a connection with the origin server only if the requested information is not available at the proxy server.

After the initial connection is setup, the client sends a request to the origin server, which is routed by the router to the proxy server. If the client requests information stored in the proxy server cache, the proxy server retrieves the information from the cache and returns the information to the client. If the information is not stored in the cache, the proxy server requests the information from the origin server, receives the information, and forwards the information to the client. The information from the origin server is also stored locally in the proxy server in the cache.

Packets received by the client from the proxy server appear to be from the origin server because the proxy server places the origin server address in the source IP field of the packets to the client. The proxy server keeps track of which origin server a client is attempting to communicate with so that when the proxy server sends a packet to the client, the proxy server can place the origin server IP address in the source field, making it appear to the client that the packet came from the origin server. In this way, transparent proxy server caching is achieved without requiring special configuration of the client.

Because of the cooperation between the router and the proxy server, the two elements can be considered as a single intermediate entity communicatively coupled between the client and the origin server. Therefore, communications between the client and origin server can be viewed as the intermediate entity communicating with the client and origin server.

FIG. 1 is a block diagram of an embodiment of a system in which apparatus and methods consistent with the invention may be practiced. The system is comprised of clients 22, 24 and 26, network 20, gateway 18, router 16, proxy server 14, network 12, and origin server 10. The primary purpose of the system is to use intermediate entity 28, which includes router 16 and proxy server 14, to facilitate communications between clients 22, 24, and 26 and an origin server, such as origin server 10, without specially configuring clients 22, 24, and 26 with the IP address of proxy server 14.

In conventional systems, when client 22 wants to request information or services from origin server 10, client 22 first sets up a connection by sending a SYN packet to origin server 10 via gateway 18, router 16 and network 12. Origin server 10 responds with an ACK packet, thus establishing a connection. After connection is established, client 22 requests information or services from origin server 10.

Apparatus and methods consistent with the invention, however, allow client 22 to transmit packets intended for origin server 10, but communication between client 22 and origin server 10 is actually handled by an intermediate entity 28 comprised of router 16 and proxy server 14. Proxy server 14 handles the request even though client 22 has not been configured with the IP address of proxy server 14.

Figure 2:
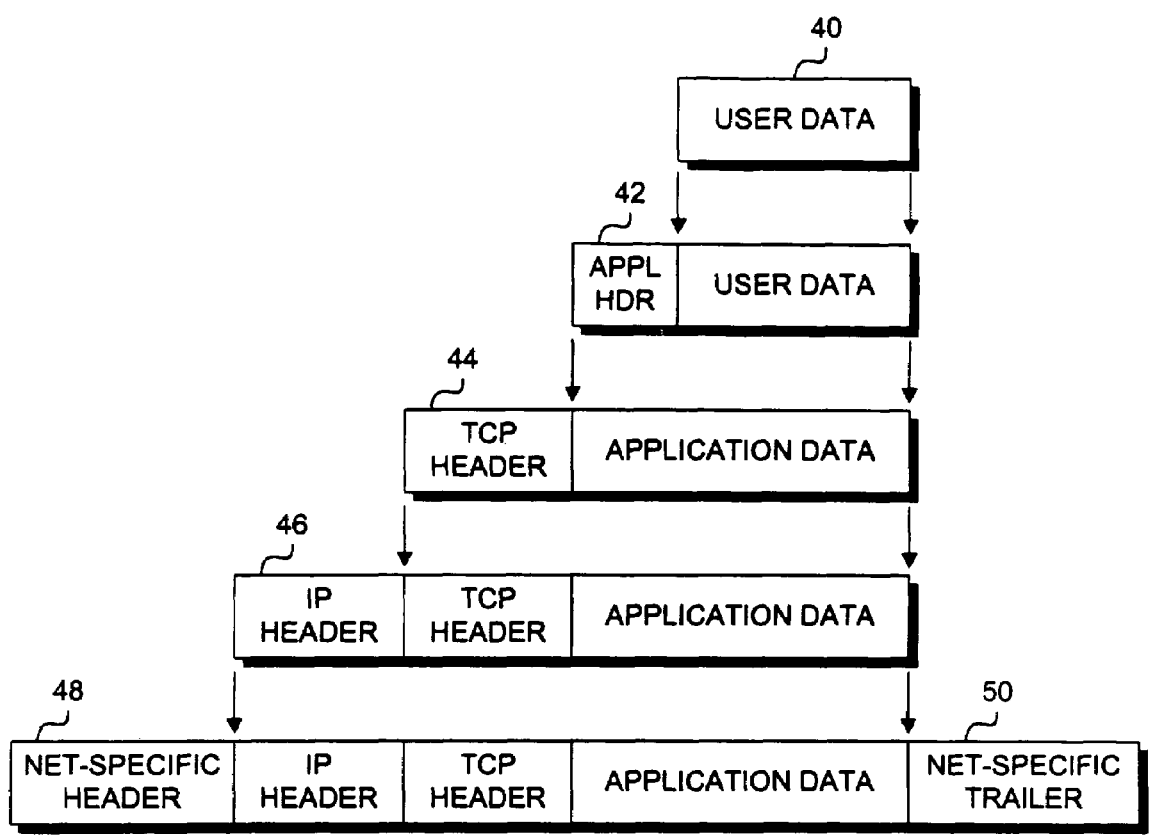
FIG. 2 illustrates protocol layers of a conventional packet.

FIG. 2 illustrates protocol layers of a conventional packet. Protocol layers are used by various entities in a network when transferring user data 40 in packets through the network. User data 40 is created by an application program. For example, user data 40 may be an information request created by a browser. An application header 42 containing administrative information is concatenated to user data 40. A Transport Control Protocol (TCP) header 44, an Internet Protocol (IP) header 46, and a network-specific header 48 are also successively concatenated. The final protocol layer also includes a network-specific trailer 50. These protocol layers are used to transfer the packet through the network.

Figure 3:
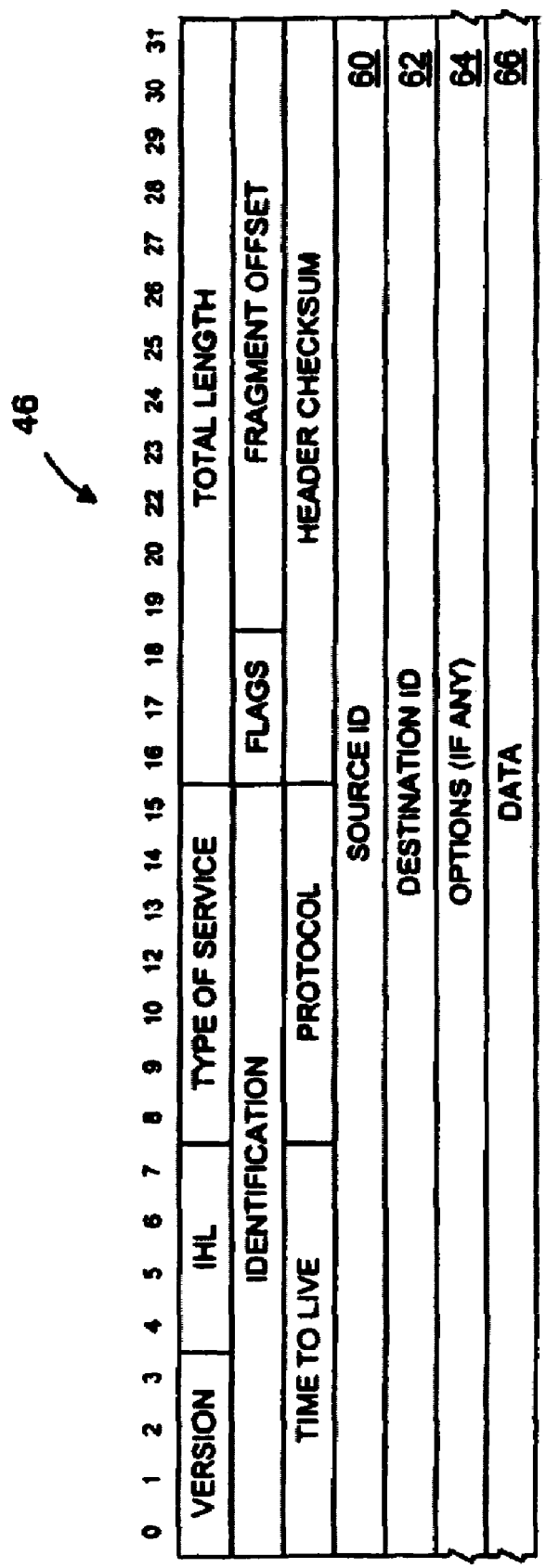
FIG. 3 is a block diagram illustrating the fields of an IP header.

FIG. 3 is a block diagram illustrating the fields of IP header 46. The fields illustrated in FIG. 3 are conventional and will not be discussed in detail herein except for the source ID 60, destination ID 62, options 64, and data 66 fields, which are used in one embodiment of apparatus and methods consistent with the invention.

Figure 4:
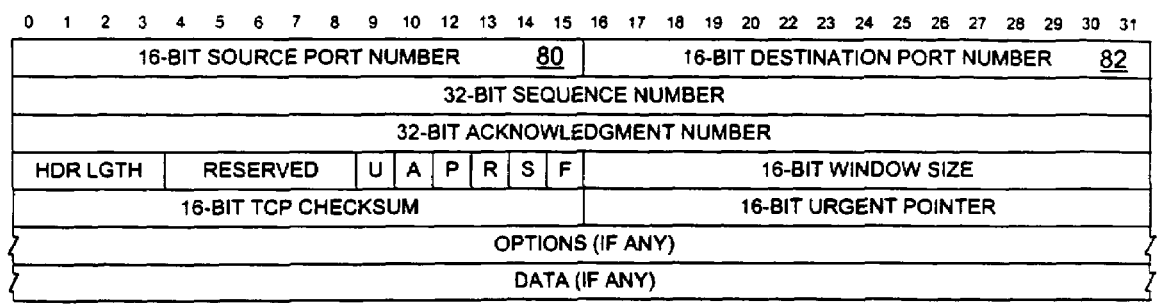
FIG. 4 illustrates the fields of a TCP header.

FIG. 4 illustrates the fields of TCP header 44. The fields are conventional and will not be discussed herein except for the 16-bit source port number field 80 and the 16-bit destination port number field 82, which are used in one embodiment of the invention. Source port field 80 stores the port number for the source of the packet. Destination port field 82 stores the port number for the destination to which a packet is being sent. For example, a destination field having a port number of 21 indicates an FTP server, and port 23 indicates a Telnet server. The default for HTTP servers is port 80.

To obtain information from origin server 10, client 22 first sets up a connection with origin server 10 by preparing a connection set up packet (a "SYN" packet) to establish the connection with origin server 10. Client 22 creates the SYN packet by writing the IP address of origin server 10 in destination address field 62 of IP header 46, and its own IP address in source field 60 of IP header 46. Client 22 also writes information in the packet that identifies the packet as a SYN packet. For example, using the format shown in FIG. 4, a SYN packet is identified by the A bit being set to 0 and the S bit being set to 1.

Client 22 transmits the SYN packet to gateway 18. Gateway 18 forwards it to router 16. In conventional systems, router 16 forwards the packet directly to origin server 10 via network 12 without going through proxy server 14. Thus, any advantages of proxy server 14, such as caching, are lost.

In systems consistent with the invention, however, router 16 is programmed to recognize certain types of packets and forward them to proxy server 14. For example, in one embodiment, router 16 recognizes packets destined for HTTP servers, such as origin server 110, and routes these packets to proxy server 14 instead of network 12. More particularly, router 16 determines which packets are destined for an HTTP server based on the destination port field 82 of TCP header 44. Packets destined for an HTTP server have port number 80 in destination port field 82, indicating that the packet is destined for an HTTP server.

Figure 5:
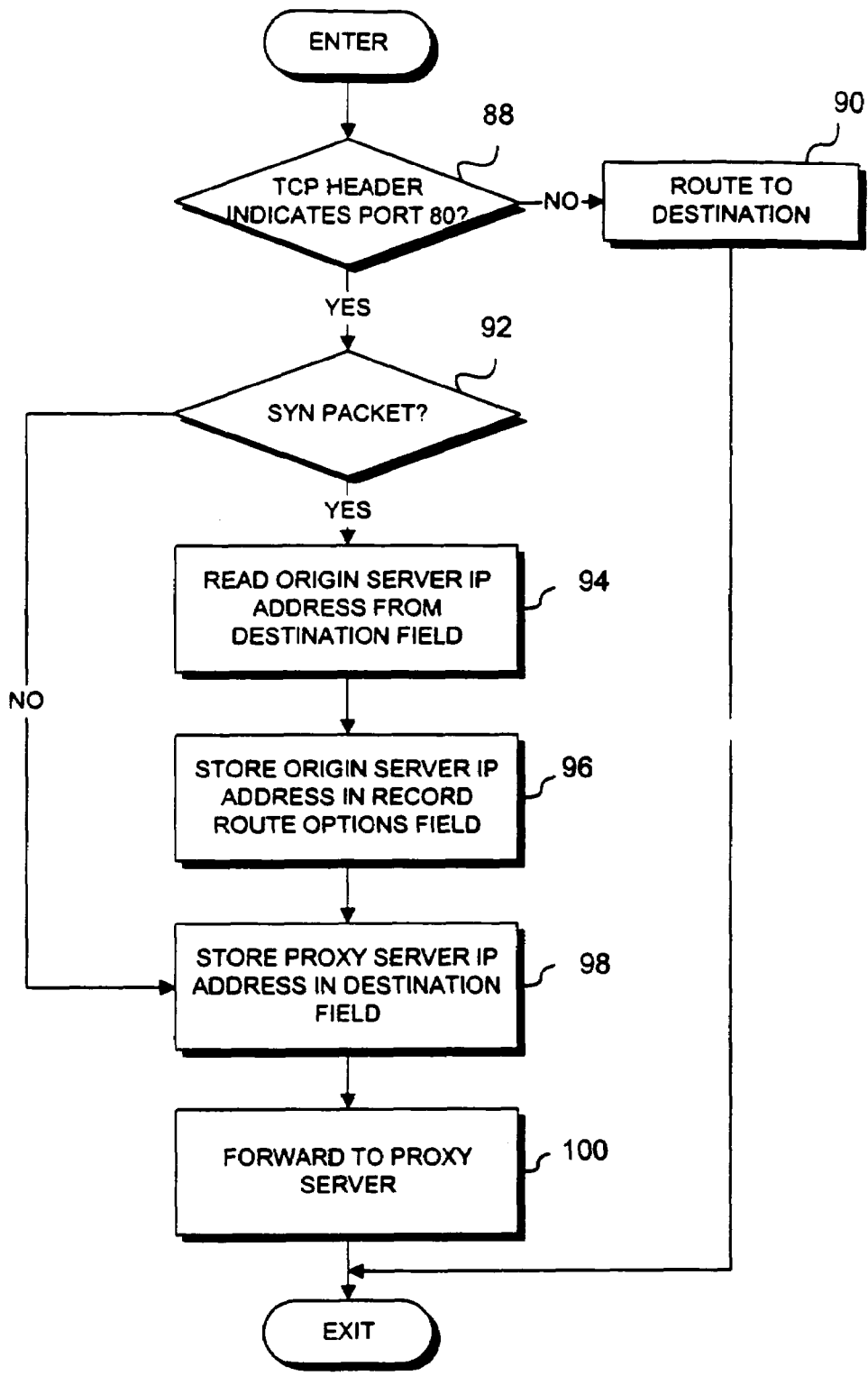
FIG. 5 is a flow chart showing the processing of packets received by a router from a client.

FIG. 5 is a flow chart showing the processing of packets received by router 16 from a client. Router 16 processes incoming packets by filtering them, and performing certain actions based on the filtering. Router 16 first determines whether the destination port field 82 of TCP header 46 in the packet indicates port 80 (step 88), meaning that the packet is destined for an HTTP server. If the destination port field 82 does not indicate port 80, it is routed to the destination indicated in the destination field of the packet (step 90).

If the destination port field 82 indicates port 80, however, router 16 processes the packet. Router 16 first determines whether the packet is a SYN packet (step 92). If the packet is a SYN packet, router 16 reads the origin server IP address from the destination field (step 94), and stores the origin server IP address in the record route options field of the packet (step 96). Router 16 then stores the proxy server IP address in the destination field (step 98), and forwards the packet to proxy server 14 (step 100).

Because the origin server IP address is stored in the record route options field, proxy server 14 can read the field and store the information to keep track of which clients are trying to communicate with which origin servers. More particularly, proxy server 14 reads the origin server IP address from the record route options field and the client IP address from the source field, and stores the IP address and the client IP address in a table to track the correspondence between clients and the respective origin servers they are attempting to communicate with.

If router 16 determines in step 92 that the packet is not a SYN packet, router 16 simply stores the proxy server IP address in the destination field (step 98) and forwards the packet to the proxy server 14 (step 100). Thus, for packets other than SYN packets, router 16 simply writes the IP address of the proxy server 14 in the destination field of the packet to route it to proxy server 14.

Figure 6:
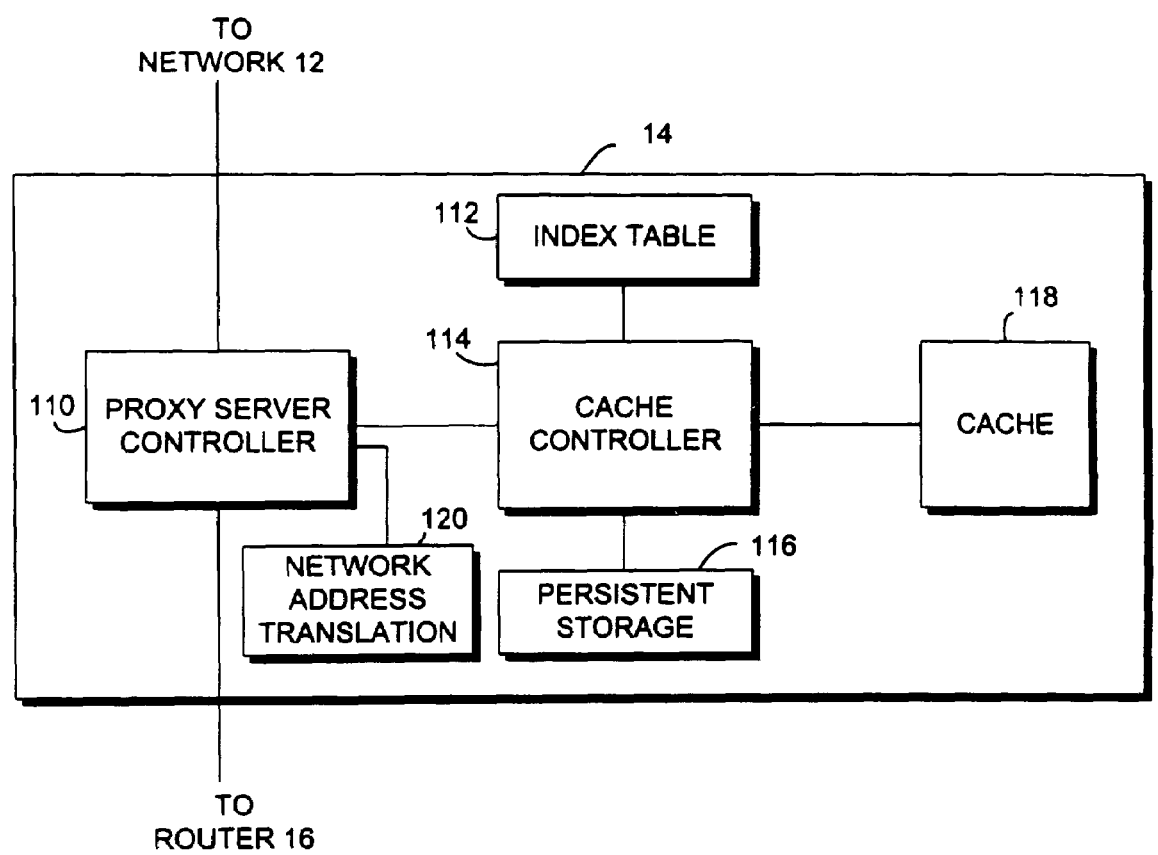
FIG. 6 is a block diagram showing an embodiment of a proxy server consistent with the principles of the present invention.

FIG. 6 is a block diagram showing an embodiment of proxy server 14 consistent with the principles of the invention. Proxy server 14 responds to client packets received from router 16 by setting up a connection with the origin server the client is attempting to communicate with, and then handling information requests to the origin server on behalf of the client.

Proxy server 14 handles client information requests by either retrieving the information from a local cache 118 if the information is in the cache, or by obtaining the requested information from origin server 10 if the requested information is not in the cache. Proxy server 14 may be implemented by programming a conventional computer, as is well-understood in the art. The elements shown in FIG. 6 may be implemented in hardware, software, or a combination of hardware and software. Proxy server 14 is controlled by proxy server controller 110, which is connected to network address translator (NAT) 120 and cache controller 114. NAT 120 is used by proxy server controller 110 to translate network addresses, if necessary. Cache controller 114 is connected to an index table 112, a cache 118, and a persistent storage 116. Index table 112 stores information defining what data is stored in cache 118. Persistent storage 116 stores information that will be saved if the system goes down, such as when power is lost.

Proxy server controller 110 receives client packets from router 16 and sends the packets to cache controller 114. Cache controller 114 accesses index table 112 to determine whether information requested by the client is present in cache 118. If the information is present in cache 118, cache controller 114 retrieves the information and returns it to proxy server controller 110. A system for implementing cache 118 is disclosed in U.S. application Ser. No. 09/288, 023, entitled "Apparatus and Methods for Providing a Cyclic Buffer," which is hereby incorporated by reference. Proxy server controller 110 forwards the information to client 22.

If cache controller 114 determines from index table 112 that cache 118 does not contain the requested information, cache controller 114 sends an indication that the information is not cached to proxy server controller 110. Proxy server controller 110 responds to the indication by retrieving the information from origin server 10.

Figure 7:
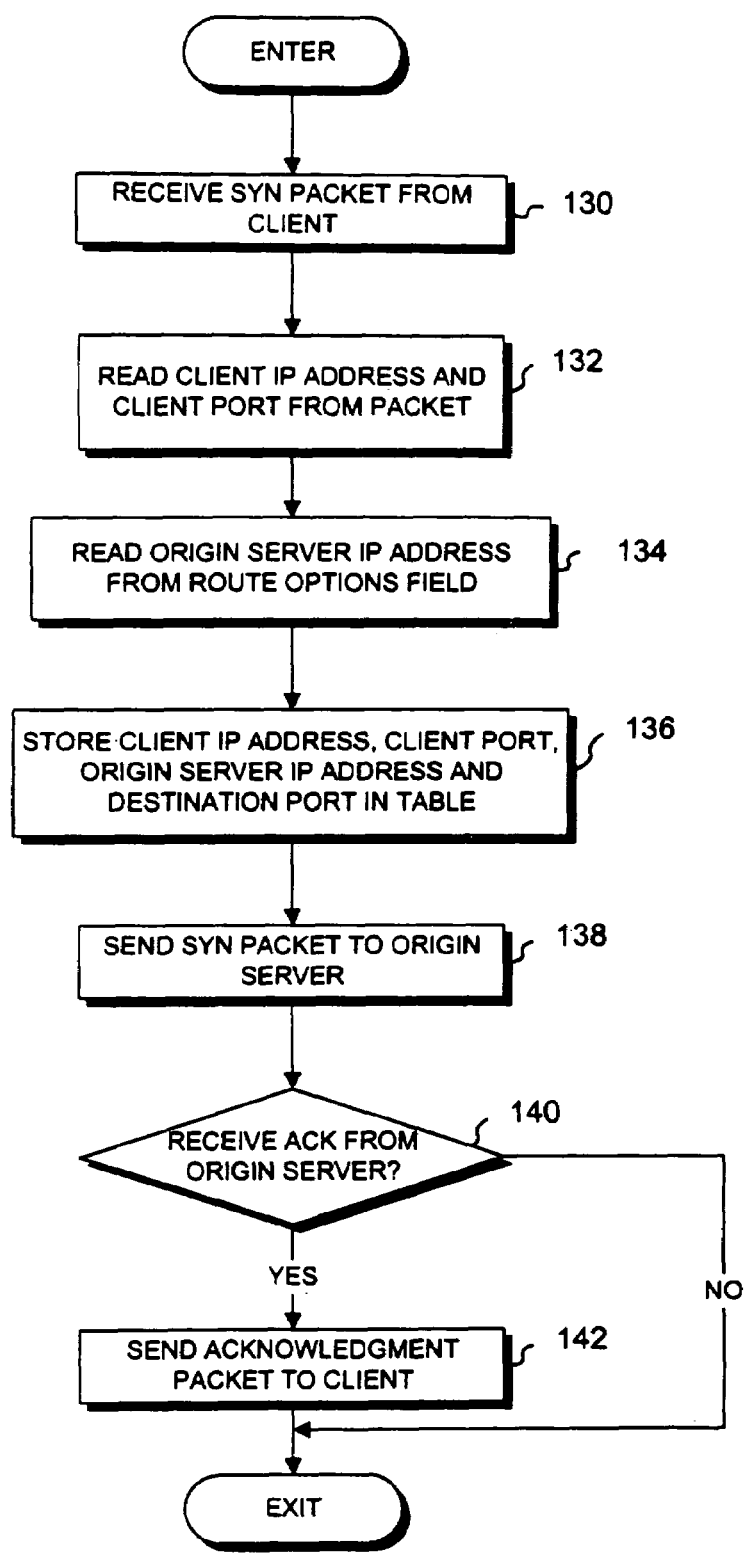
FIG. 7 is a flow chart showing the processing performed by a proxy server in response to receiving a SYN packet from a client.

FIG. 7 is a flow chart showing the processing performed by proxy server 14 in response to receiving a SYN packet from client 22 via router 16 (step 130). In response to the SYN packet, proxy server 14 reads the client IP address and client port from the packet (step 132) as well as the origin server IP address from the record route options field (step 134) and stores the client IP address, client port, origin server IP address and destination port in a table (step 136).

Proxy server 14 then sends a SYN packet to origin server 10 to establish a connection (step 138). If proxy server 14 receives an acknowledgment packet from origin server 10 (step 140), which completes the connection between proxy server 14 and origin server 10, then proxy server 14 sends an acknowledgment packet to client 22 (step 142). Proxy server 14 prepares the acknowledgment packet by storing the client IP address in the destination field and the origin server IP address in the source field of the acknowledgment packet. Router 16 receives the acknowledgment packet and forwards the packet to client 22. If proxy server 14 does not receive an acknowledgment packet from origin server 10 (step 140), the process exits.

The acknowledgment packet received by client 22 appears to be from origin server 10 because the origin server IP address is written in the source field of the packet. In summary, client 22 attempted to send a SYN packet to origin server 10, and receives an acknowledgment packet that appears to be from origin server 10, so from the perspective of client 22 a connection has been set up between itself and origin server 10. In actuality, two connections have been set up: between client 22 and proxy server 14, and between proxy server 14 and origin server 10.

Figure 8:
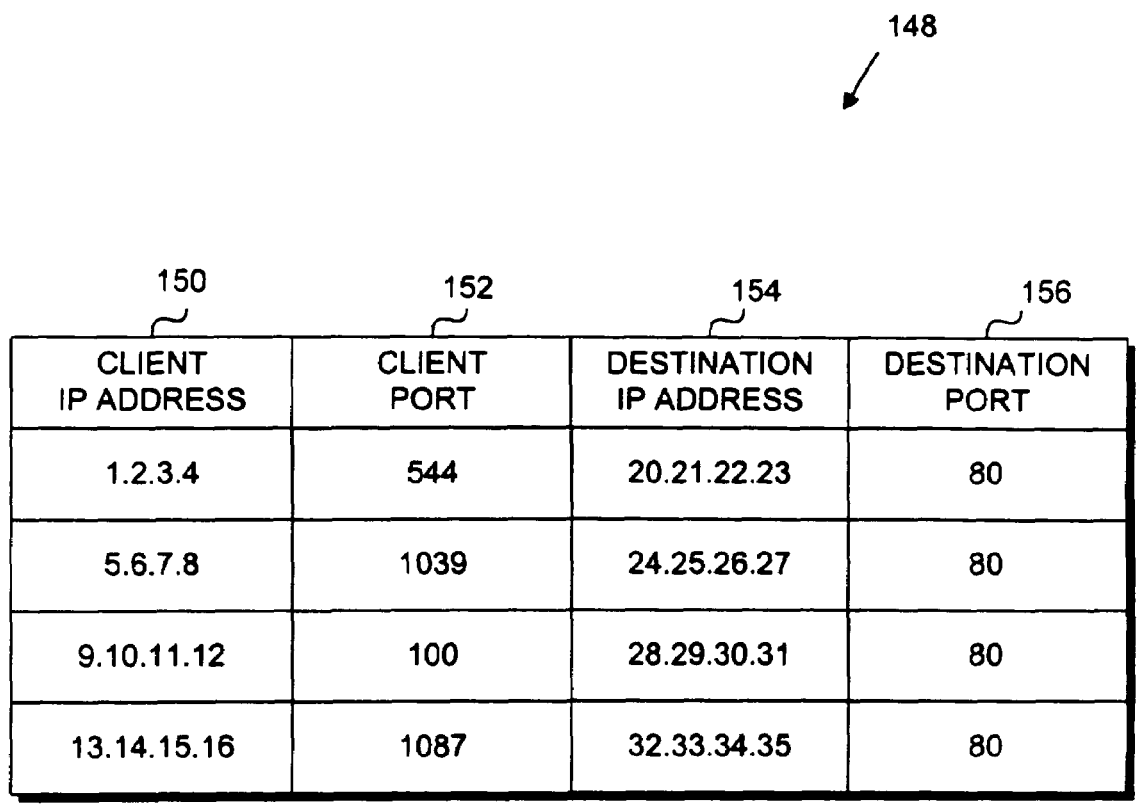
FIG. 8 is a block diagram illustrating the table created by a proxy server.

FIG. 8 is a block diagram illustrating the table created by proxy server 14 in step 136 of FIG. 7. Proxy server 14 uses table 148 to maintain correspondence between clients and respective origin servers the clients are requesting information from. Table 148 comprises a client IP address column 150, a client port column 152, a destination IP address column 154, and a destination port column 156. After the initial connections between client 22 and proxy server 14 and between proxy server 14 and origin server 10 are set up, proxy server 14 uses table 148 when receiving packets from origin server 10 that are destined for client 22. More particularly, for packets from origin server 10, proxy server 14 matches the origin server IP address from the source field of the packet with the table entry having the same origin server IP address in destination IP address column 154, and sends the information to the corresponding client IP address and client port from client IP address column 150 and client port column 152, respectively.

Figure 9:
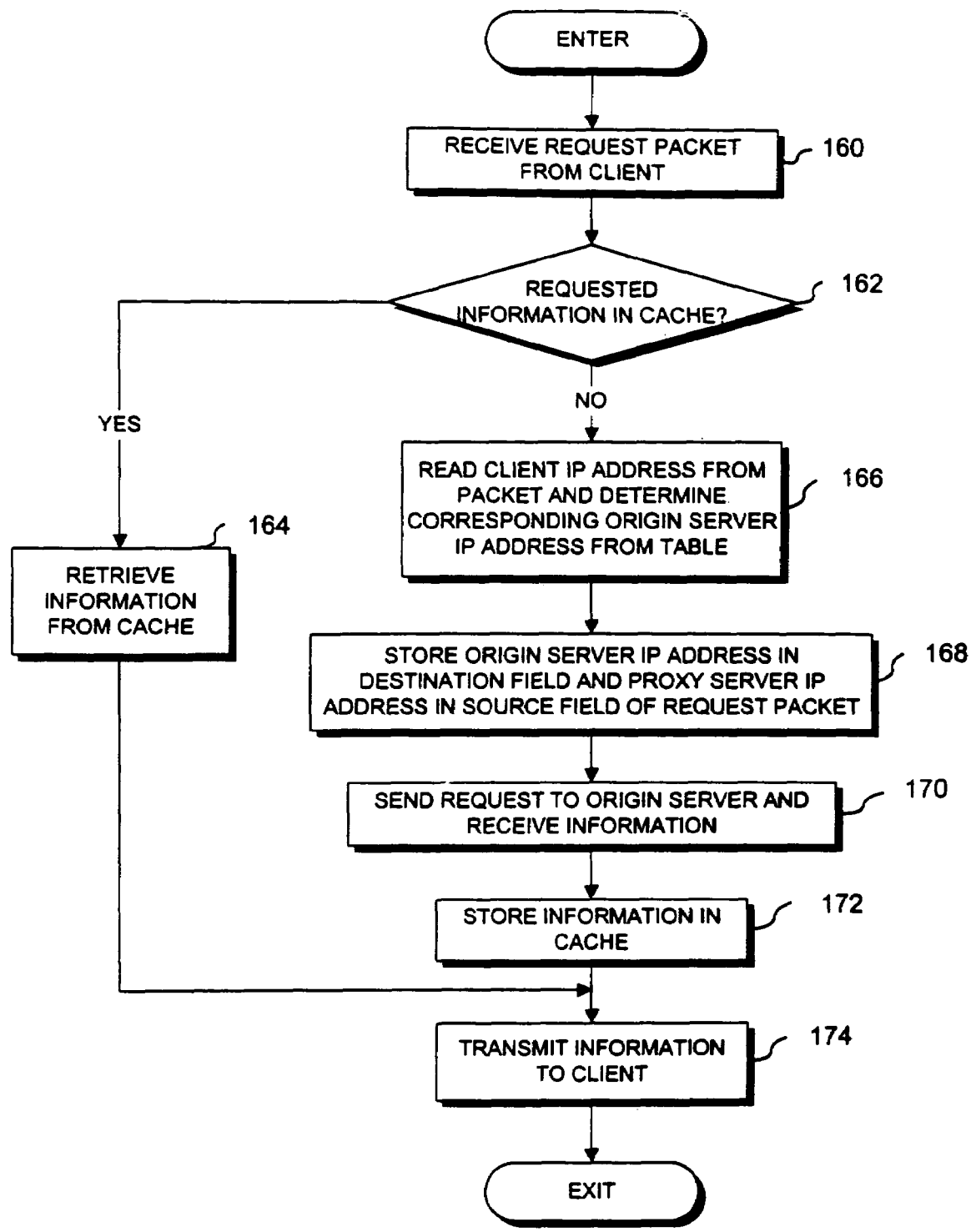
FIG. 9 illustrates the process performed by a proxy server when a request packet is received from a client.

Similarly, for packets from client 22 subsequent to the SYN packet, proxy server 14 uses table 148 to determine which origin server the packet is intended for. This is because a SYN packet contains the origin server address in the record route options field, whereas packets subsequent to the SYN packet do not. Therefore, proxy server 14 must use table 148 to determine which origin server a client is trying to communicate with for non-SYN packets FIG. 9 illustrates the process performed by proxy server 14 when a request packet is received from client 22. Proxy server 14 receives the request packet (step 160), and determines whether the requested information is stored in cache 118 (step 162). If the information is stored in cache 118, proxy server 14 retrieves the information (step 164) and forwards it to the client via router 16 (step 174). If the requested information is not stored in cache 118, however, proxy server 14 must request the information from origin server 10.

To retrieve the information from origin server 10, proxy server 14 reads the client IP address from the source field of the request packet from client 22, uses table 148 to determine the origin server IP address corresponding to the client IP address (step 166), and stores the proxy server IP address and origin server IP address in a request packet (step 168). Proxy server 14 then transmits the request packet to origin server 10 and receives the information from origin server 10 (step 170). Proxy server 14 stores the information from origin server 10 in the cache (step 172), and transmits the information to the client (step 174). Thus, transparent proxy caching is achieved because proxy server 14 has handled the client set up and request, even though the client was not configured to use proxy server 14.

In summary, proxy server 14 sets up a connection with client 22, receives requests from client 22, and returns the information to client 22 if it is stored in cache 118 of proxy server 14. If the requested information is not stored in cache 118, proxy server 14 requests the information from origin server 10. Upon receiving the information from origin server 10, proxy server 14 transmits it to client 22 and caches it locally in cache. All of these transactions take place without programming client 22 with the IP address of proxy server 14.

Figure 10:
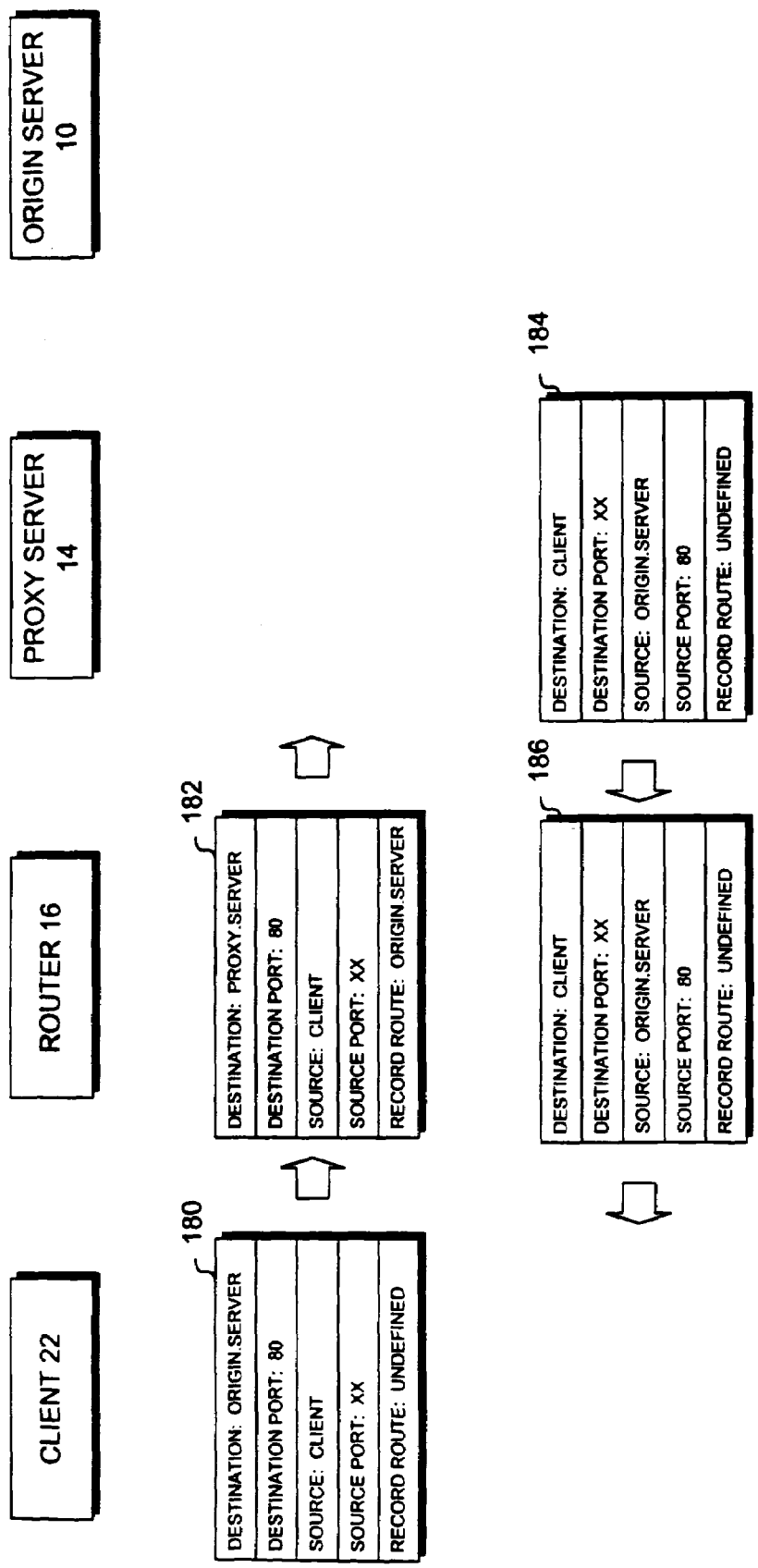
FIG. 10 is a block diagram illustrating fields of packets transmitted between a client, a router, a proxy server, and an origin server.

FIG. 10 is a block diagram illustrating a simplified representation of certain fields of packets transmitted between client 22, router 16, proxy server 14, and origin server 10 to establish a connection. The blocks below client 22, router 16, proxy server 14, and origin server 10, illustrate particular fields sent in packets between the devices. A session starts with client 22 sending a SYN packet having fields 180 to router 16. SYN packet fields 180 includes the origin server IP address in the destination field, 80 in the destination port field, the client IP address in the source field, and XX (representing the source port) in the source port field. The record route options field is undefined.

Router 16 receives the SYN packet. If router 16 determines the packet is destined for port 80, meaning that it is an HTTP packet, and that the packet is a SYN packet, router 16 prepares a packet to be sent to proxy server 14 by storing the proxy server IP address in the destination field, the client IP address in the source field, and the origin server IP address in the record route options field. Router 16 then forwards a SYN packet having fields 182 to proxy server 14.

Proxy server 14 responds to the SYN packet by storing the client IP address and origin server address in a table, and sends a SYN packet to origin server 10 to set up a connection. If origin server 10 sends back an acknowledgment packet, which completes connection setup between origin server 10 and proxy server 14, then proxy server 14 sends an acknowledgment packet having fields 184 to client 22. Proxy server 14 prepares the acknowledgment packet by writing the client IP address in the destination field, the client port XX in the destination port field, the origin server IP address in the source field, and 80 in the source port field. The record route option field is undefined. This packet is transmitted to router 16, which forwards the packet to client 22. This completes connection setup between client 22 and proxy server 14.

Figure 11:
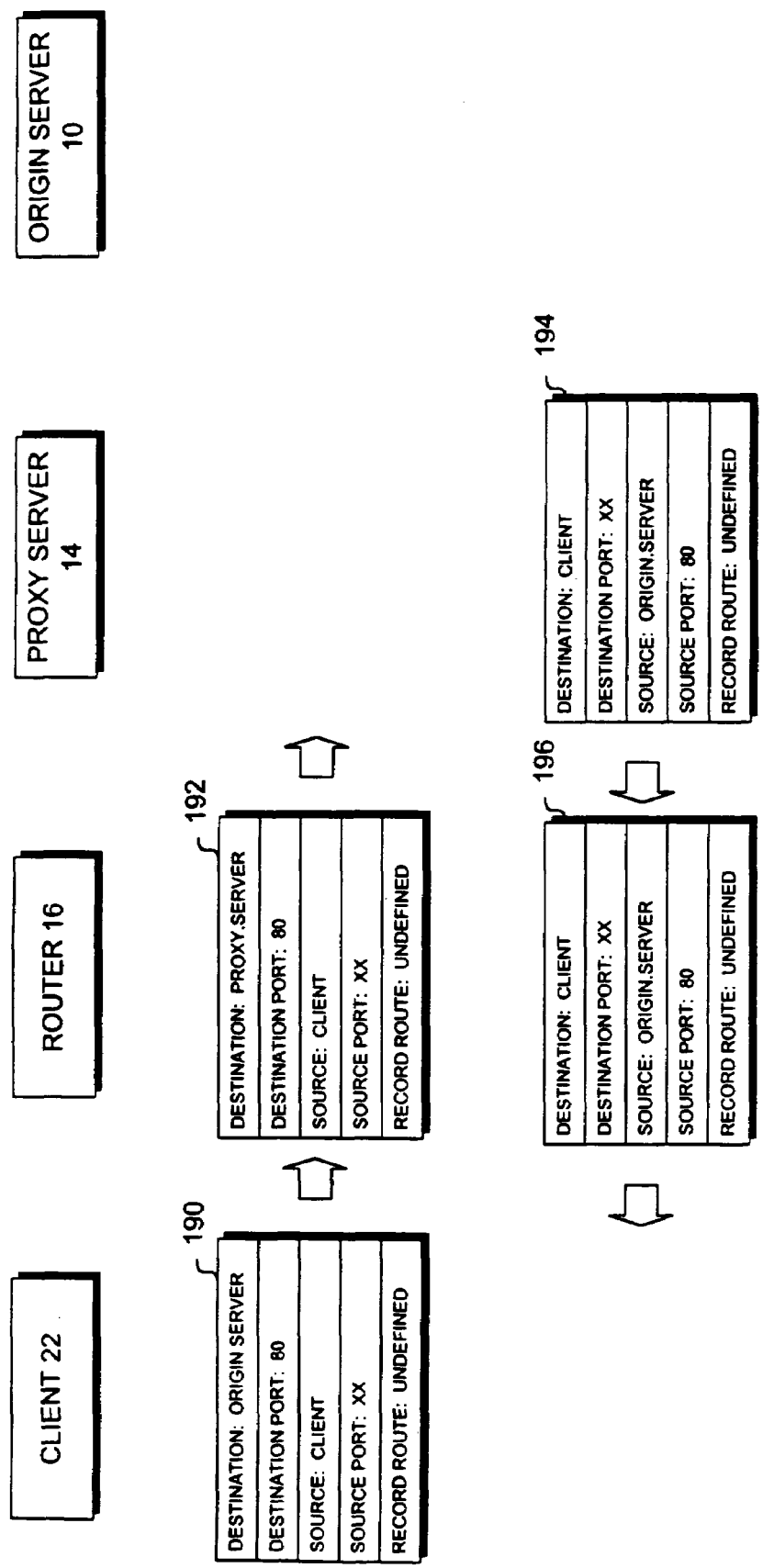
FIG. 11 is a block diagram illustrating packet fields when a client sends a request packet to an origin server.

FIG. 11 is a block diagram illustrating a simplified representation of certain packet fields transmitted between elements when client 22 sends a request packet to origin server 10 and the information is stored in cache 118 of proxy server 14. Packet fields 190, 194, and 196 carry the same information as fields 180, 184, and 186, respectively, of FIG. 10. In FIG. 10, however, since the packet transmitted from client 22 to router 14 is a SYN packet, router 14 stores the IP address of the origin server in the record route options field to communicate to proxy server 14 the IP address of the origin server that client 22 is attempting to establish communication with. The record route options field of fields 192, however, is undefined because the packet is not a SYN packet. If proxy server 14 has the requested information, the information is returned in a packet having fields 194.

Figure 12:
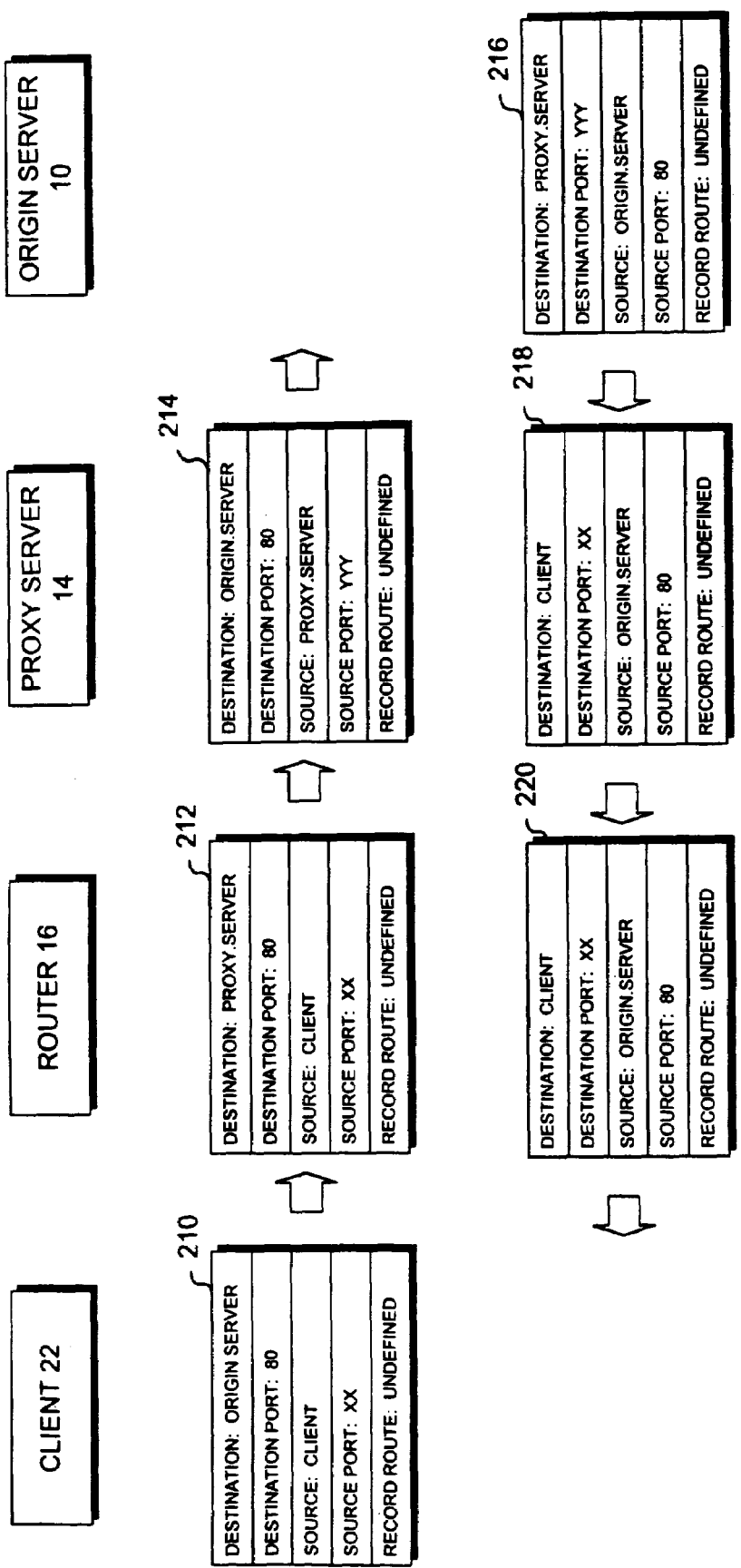
FIG. 12 illustrates packets when a proxy server must retrieve the information from an origin server because the information is not cached.

FIG. 12 illustrates a simplified representation of various packet fields of packets transmitted between elements when information requested by client 22 is not in cache 118, thus requiring proxy server 14 to retrieve the information from origin server 10. To request information from origin server 10, proxy server 14 prepares a request packet including fields 214. Fields 214 include the IP address of origin server 10 stored in the destination field 80 in the destination port field, the IP address of proxy server 14 stored in the source field, and the proxy server port in the source port field. The record route options field is undefined.

Origin server 10 responds with a packet containing the requested information, and comprising fields 216. Fields 216 have the IP address of proxy server 14 in the destination field, the proxy server port in the destination port field, the IP address of origin server 10 in the source field, and 80 in the source port field. The record route options field is undefined. The format of fields 214 and 216 are the same for all packets between origin server 10 to proxy server 14.

Figure 13:
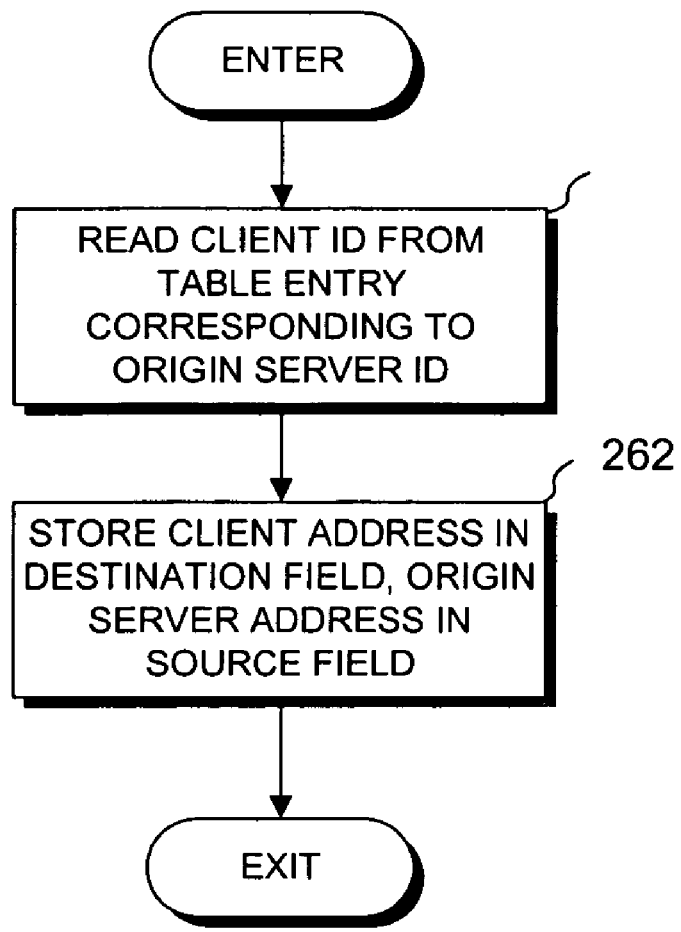
FIG. 13 illustrates the process performed when a proxy server receives a packet.

FIG. 13 illustrates the process performed when proxy server 14 receives a packet from origin server 10, in the form of a packet having fields 216. Proxy server 14 looks up the client IP address in table 148 corresponding to the origin server IP address (step 260), and creates a packet having fields 218, which include the client IP address in the destination field and the origin server IP address in the source field (step 262). Proxy server 14 forwards the packet to router 16. Router 16 receives packet 218 from proxy server 14, and forwards the packet to client 22.

In the embodiment described above, the origin server IP address is communicated to proxy server 14 using the record route options field when client 22 transmits a SYN packet to origin server 10. Upon receiving the redirected SYN packet, proxy server 14 creates a table for tracking the correspondence between client 22 and the origin server IP address stored in the record route options filed. There are other ways in which the packet fields can be managed by router 16 and proxy server 14 to allow client 22 to send packets as if communicating directly with origin server 10.

FIG. 14 illustrates fields of packets sent from proxy server 14 to client 22. In this embodiment, proxy server 14 stores the origin server IP address in the record route options field to communicate the IP address of origin server 10 to router 16. Router 16 then reads the origin server IP address from the record route options field and stores the origin server IP address in the source field of fields 230.

FIG. 15 illustrates the fields of packets being transmitted by proxy server 14 and router 16 in accordance with another embodiment of the invention. In this embodiment, router 16 uses a lookup table. Fields 240 illustrate that the packets sent by proxy server 14 to router 16 store the client IP address in the destination field, the client port in the destination port field, the proxy server IP address in the source field, the proxy server port in the source port field, and the record route field is undefined. Router 16 uses a lookup table to find the origin server IP address corresponding to the client IP address in the destination field. The table used by router 16 is created at the time client 22 sends a SYN packet to start a connection, similar to table 148 created by proxy server 14.

Figure 16:
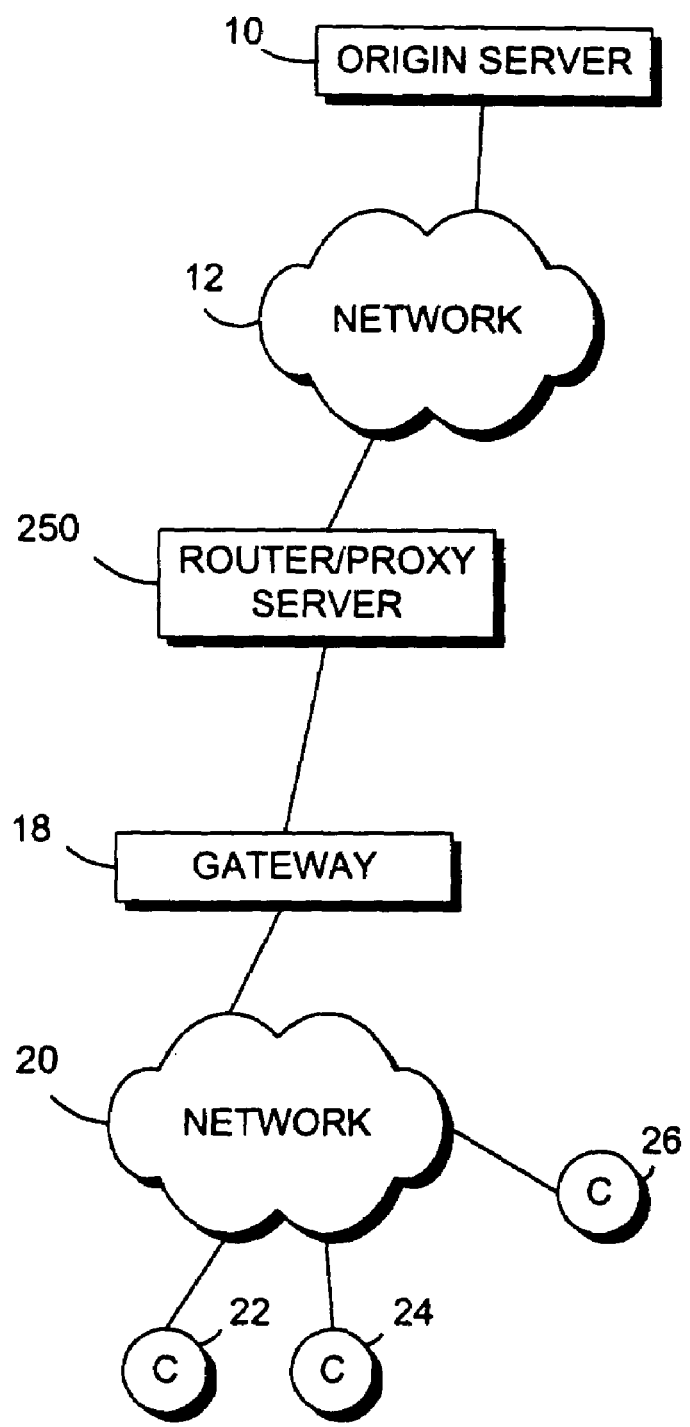
FIG. 16 shows another embodiment wherein the functions of the router and proxy server are performed by an integrated router/proxy server.

FIG. 16 shows an embodiment wherein the functions of router 16 and proxy server 14 are performed by integrated router/proxy server 250. Implementing router 16 and proxy server 14 as integrated router/proxy server 250 eliminates the overhead of transmitting packets between router 16 and proxy server 14. The functions performed by the system are the same as described above, except that no packets are exchanged between router 16 and proxy server 14 because the two elements are integrated together.

CONCLUSION

It will be apparent to those skilled in the art that various modifications and variations can be made in the transparent proxy server apparatus and methods consistent with the principles of the present invention without departing from the scope or spirit of the invention. Although several embodiments have been described above, other variations are possible within the spirit and scope consistent with the principles of the present invention.

For example, all that is required is that client 22 be allowed to transmit and receive packets as if it is communicating directly with origin server 10. An intermediate entity, for example proxy server 14, actually handles the communications. How the intermediate entity manipulates the fields of the packets, such as the record route options field, and uses tables to produce transparent caching may occur in a variety of ways without departing from the spirit and scope of the invention consistent with the principles of the invention.

In another embodiment, instead of redirecting packets to a proxy server based on the type of origin server, the redirection of packets could be based on other criteria. For example, the router could redirect packets based on IP addresses of particular origin servers.

Although transparent proxy server 14 has been described in terms of a caching system, the server could also be implemented in a non-caching proxy server system. Alternatively, other types of processing could be performed instead of or in addition to caching, and the conditional passing on of request packets to another entity (e.g., an origin server) could be related to these other types of processing. For example, proxy server 14 might determine whether a particular operation can be performed at the proxy server. If the requested operation can be performed by the proxy server, then the proxy server operation will handle the request and the result of the operation would be returned to the client, if necessary. For example, proxy server could perform a complex graphics processing, number crunching, or other operation. If the proxy server cannot perform the operation locally, the source and record route option fields of the packet would be modified as described herein and sent to the destination specified by the client.

Methods and apparatus consistent with the invention may be practiced in any type of communication system, or combination of types of communication systems. For example, connections between the client, router, proxy server, and origin server, may be implemented using wired or wireless connections.

The apparatus and methods consistent with the invention are related to proxy servers and proxy server caching. Services necessary for carrying out the invention, such as a router and proxy server, may be implemented in whole or in part by one or more sequences of instructions, executed by the devices which carry out the apparatus and methods described herein. Such instructions may be read by the devices from a computer-readable medium, such as a storage device. Execution of sequences of instructions by the devices causes performance of process steps consistent with the present invention described herein. Execution of sequences of instructions may also be considered to implement apparatus elements that perform the process steps. Hard-wired circuitry may be used in place of or in combination with software instructions to implement the invention. Thus, embodiments of the invention are not limited to any specific combination of hardware circuitry and software.

The term "computer usable medium" as used herein refers to any medium that may store instructions for execution. The instructions may be structured as modules that cooperate to implement apparatus and methods as the instructions are executed. Such a medium may take many forms, including but not limited to, non-volatile memory media, volatile memory media, and transmission media. Non-volatile memory media includes, for example, optical or magnetic disks. Volatile memory media includes RAM. Transmission media includes, for example, coaxial cables, copper wire and fiber optics, including the wires. Transmission media can also take the form of acoustic or light waves, such as those generated during radio-wave and infra-red data communications. Common forms of computer-readable media include, for example, a floppy disk, a flexible disk, hard disk, magnetic tape, or any other magnetic storage medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read and use.

Various forms of compute-readable media may be involved in carrying one or more sequences of instructions for execution to implement all or part of the transparent proxy server described herein. For example, the instructions may initially be carried on a magnetic disk or a remote computer. The remote computer can load the instructions into its dynamic memory and send the instructions over a telephone line using a modem. A modem local to a computer system can receive the data on the telephone line and use an infra-red transmitter to convert the data to an infra-red signal. An infra-red detector coupled to appropriate circuitry can receive the data carried in the infra-red signal and place the data on a bus. The bus may carry data to a memory, from which a processor retrieves and executes the instructions. The instructions received by the memory may optionally be stored on a storage device either before or after execution by the processor.

Other embodiments of the invention will be apparent to those skilled in the art from consideration of the specification and practice of the disclosed embodiments. The specification and examples are exemplary only, and the true scope and spirit of the invention is defined by the following claims and their equivalents.

We claim:

1. A method performed by an intermediate entity for transparently handling communications between a client and a destination, comprising:
   establishing communication sessions between the client and the intermediate entity and the destination and the intermediate entity;
   receiving a first packet from the client including data and a client address corresponding to the client;
   reading a destination address from a destination field of the first packet; and
   preparing an intermediate communication having a source field, a destination field, and a temporary field, the preparing including:
      storing the client address in the source field;
      storing the destination address in the temporary field; and
      storing an intermediate destination address in the destination field.

2. An intermediate entity for transparently handling communications between a client and a destination, comprising:
   means for establishing communication sessions between the client and the intermediate entity and the destination and the intermediate entity;
   means for receiving a first packet from the client including data and a client address corresponding to the client;
   means for reading a destination address from a destination field of the first packet; and
   means for preparing an intermediate communication having a source field, a destination field, and a temporary field, the preparing including:
      storing the client address in the source field;
      storing the destination address in the temporary field; and
      storing an intermediate destination address in the destination field.

3. An intermediate entity for transparently handling communications between a client and a destination, comprising:
   a communication session establishing element for establishing communication sessions between the client and the intermediate entity and the destination and the intermediate entity;
   a packet receiving element for receiving a first packet from the client including data and a client address corresponding to the client;
   a reading element for reading a destination address from a destination field of the first packet; and
   an intermediate communication preparation element for preparing an intermediate communication having a source field, a destination field, and a temporary field, the preparing including:
      storing the client address in the source field;
      storing the destination address in the temporary field; and
      storing an intermediate destination address in the destination field.

4. A computer program product comprising:
   a computer usable medium having computer readable code embodied therein for transparently handling communications between a client and a destination, the computer usable medium comprising:
   a module for establishing communication sessions between the client and the intermediate entity and the destination and the intermediate entity;
   a module for receiving a first packet from the client including data and a client address corresponding to the client;
   a module for reading a destination address from a destination field of the first packet; and
   a module for preparing an intermediate communication having a source field, a destination field, and a temporary field, the preparing including:
      storing the client address in the source field;
      storing the destination address in the temporary field; and
      storing an intermediate destination address in the destination field.

5. A method for transparently handling communications between a client and a destination, comprising:
sending a client communication addressed to a destination from a client to an intermediate entity;
analyzing the client communication;
reading a destination address from a destination field of the client communication;
preparing an intermediate communication having a source field, a destination field, and a temporary field, the preparing including:
storing a client address in the source field;
storing the destination address in the temporary field; and
storing an intermediate destination address in the destination field;
transmitting a connection setup communication to the destination for establishing a connection between the destination and the intermediate entity;
receiving a connection setup acknowledgement communication from the destination; and
associating the destination address with the client address.

6. The method of claim 5, further including:
forwarding the client communication to the destination if the destination is a first type of destination; and
performing the steps of preparing an intermediate communication and transmitting a connection setup communication if the destination is a second type of destination.

7. The method of claim 5, further including:
sending to the client a connection setup acknowledgment having the destination address in the source field in response to the connection setup acknowledgment received from the destination.

8. The method of claim 5, wherein associating includes:
storing information associating the client address with the destination address.

9. The method of claim 8, further including:
creating a communication to the destination using the information associating the client and the destination addresses in response to a request from the client.

10. The method of claim 8, further including:
creating a communication to the client using the information associating the client and the destination addresses in response to a communication from the destination.

11. The method of claim 5, further including:
determining whether the client communication is a connection setup request; and
storing the intermediate entity address in a destination field in response to a determination that the client communication is not a connection setup request.

12. The method of claim 5, further including:
performing a service at the intermediate entity in response to a service request from the client.

13. The method of claim 12, further including:
preparing a communication to the client based on performance of the service and including the destination address in the source field.

14. A system for transparently handling communications between a client and a destination, comprising:
means for sending a client communication addressed to a destination from a client to an intermediate entity;
means for analyzing the client communication;
means for reading a destination address from a destination field of the client communication;
means for preparing an intermediate communication having a source field, a destination field, and a temporary field, the preparing including:
storing a client address in the source field;
storing the destination address in the temporary field; and
storing an intermediate destination address in the destination field;
means for transmitting a connection setup communication to the destination for establishing a connection between the destination and the intermediate entity;
means for receiving a connection setup acknowledgement communication from the destination; and
means for associating the destination address with the client address.

15. The system of claim 14, further comprising:
means for forwarding the client communication to the destination if the destination is a first type of destination; and
wherein the means for preparing an intermediate communication and transmitting a connection setup communication perform said functions if the destination is a second type of destination.

16. The system of claim 14, further comprising:
means for sending to the client a connection setup acknowledgment having the destination address in the source field in response to the connection setup acknowledgment received from the destination.

17. The system of claim 14, wherein the means for associating comprises:
means for storing information associating the client address with the destination address.

18. The system of claim 17, further comprising:
means for creating a communication to the destination using the information associating the client and the destination addresses in response to a request from the client.

19. The system entity of claim 17, further comprising:
means for creating a communication to the client using the information associating the client and the destination addresses in response to a communication from the destination.

20. The system of claim 14, further comprising:
means for determining whether the client communication is a connection setup request; and
means for storing the intermediate entity address in a destination field in response to a determination that the client communication is not a connection setup request.

21. The system of claim 14, further comprising:
means for performing a service at the intermediate entity in response to receiving a service request from the client.

22. The system of claim 21, further comprising:
means for preparing a communication to the client based on performance of the service and including the destination address in the source field.

23. A system for transparently handling communications between a client and a destination, comprising:
a sending element for sending a client communication addressed to a destination from a client to an intermediate entity;
an analyzing element for analyzing the client communication;
a reading element for reading a destination address from a destination field of the client communication;

an intermediate communication preparation element for preparing an intermediate communication having a source field, a destination field, and a temporary field, the preparing including:
  storing a client address in the source field;
  storing the destination address in the temporary field; and
  storing an intermediate destination address in the destination field;
a transmitting element for transmitting a connection setup communication to the destination for establishing a connection between the destination and the intermediate entity;
a receiving element for receiving a connection setup acknowledgement communication from the destination; and
an associating element for associating the destination address with the client address.

24. The system of claim 23, further comprising:
a forwarding element for forwarding the client communication to the destination if the destination is a first type of destination; and
wherein the intermediate communication preparation element and the transmitting element perform said functions if the destination is a second type of destination.

25. The system of claim 23, further comprising:
a client connection setup acknowledgment element for sending to the client a connection setup acknowledgment having the destination address in the source field in response to the connection setup acknowledgment received from the destination.

26. The system of claim 23, wherein the associating element comprises:
a storing element for storing information associating the client address with the destination address.

27. The system of claim 26, further comprising:
a destination communication creating element for creating a communication to the destination using the information associating the client and the destination addresses in response to a request from the client.

28. The system of claim 26, further comprising:
a client communication creation element for creating a communication to the client using the information associating the client and the destination addresses in response to a communication from the destination.

29. The system of claim 23, further comprising:
a connection setup determining element for determining whether the client communication is a connection setup request; and
a storing element for storing the intermediate entity address in a destination field in response to a determination that the client communication is not a connection setup request.

30. The system of claim 23, further comprising:
a service element for performing a service at the intermediate entity in response to a service request from the client.

31. The system of claim 30, further comprising:
a client communication preparation element for preparing a communication to the client based on performance of the service and including the destination address in the source field.

32. A computer program product comprising:
a computer usable medium having computer readable code embodied therein for transparently handling communications between a client and a destination, the computer usable medium comprising:
a module for sending a client communication addressed to a destination from a client to an intermediate entity;
a module for analyzing the client communication;
a module for reading a destination address from a destination field of the client communication;
a module for preparing an intermediate communication having a source field, a destination field, and a temporary field, the preparing including:
  storing a client address in the source field;
  storing the destination address in the temporary field; and
  storing an intermediate destination address in the destination field;
a module for transmitting a connection setup communication to the destination for establishing a connection between the destination and the intermediate entity;
a module for receiving a connection setup acknowledgement communication from the destination; and
a module for associating the destination address with the client address.

33. The computer program product of claim 32, further comprising:
a module for forwarding the client communication to the destination if the destination is a first type of destination; and
wherein the modules for preparing an intermediate communication and transmitting a connection setup communication perform said functions if the destination is a second type of destination.

34. The computer program product of claim 32, further comprising:
a module for sending to the client a connection setup acknowledgment having the destination address in the source field in response to the connection setup acknowledgment received from the destination.

35. The computer program product of claim 32, wherein the module for associating comprises:
a module for storing information associating the client address with the destination address.

36. The computer program product of claim 35, further comprising:
a module for creating a communication to the destination using the information associating the client and the destination addresses in response to a request from the client.

37. The computer program product of claim 35, further comprising:
a module for creating a communication to the client using the information associating the client and the destination addresses in response to a communication from the destination.

38. The computer program product of claim 32, further comprising:
a module for determining whether the client communication is a connection setup request; and
a module for storing the intermediate entity address in a destination field in response to a determination that the client communication is not a connection setup request.

39. The computer program product of claim 32, further comprising:
a module for performing a service at the intermediate entity in response to a service request from the client.

40. The computer program product of claim 39, further comprising:
a module for preparing a communication to the client based on performance of the service and including the destination address in the source field.

* * * * *

UNITED STATES PATENT AND TRADEMARK OFFICE
CERTIFICATE OF CORRECTION

PATENT NO.        : 7,123,613 B1
APPLICATION NO.   : 09/545571
DATED             : October 17, 2006
INVENTOR(S)       : Rajeev Chawla et al.

It is certified that error appears in the above-identified patent and that said Letters Patent is hereby corrected as shown below:

On the title page, item (75), line 1, "Fremont" should read --Union City--.

Signed and Sealed this

Nineteenth Day of December, 2006

JON W. DUDAS
*Director of the United States Patent and Trademark Office*